United States Patent
Kanayama

(10) Patent No.: US 7,576,796 B2
(45) Date of Patent: Aug. 18, 2009

(54) AUTO FOCUS SYSTEM

(75) Inventor: Atsushi Kanayama, Saitama (JP)

(73) Assignee: Fujinon Corporation, Saitama (JP)

( * ) Notice: Subject to any disclaimer, the term of this patent is extended or adjusted under 35 U.S.C. 154(b) by 594 days.

(21) Appl. No.: 10/642,141

(22) Filed: Aug. 18, 2003

(65) Prior Publication Data

US 2004/0036793 A1 Feb. 26, 2004

(30) Foreign Application Priority Data

Aug. 23, 2002 (JP) ............................. 2002-243359

(51) Int. Cl.
*H04N 5/232* (2006.01)
*G03B 13/00* (2006.01)

(52) U.S. Cl. ...................................... 348/350; 348/354

(58) Field of Classification Search ......... 348/345–350, 348/353–356; 396/79, 80, 121, 122, 123, 396/124; 250/201.2, 201.4, 201.7
See application file for complete search history.

(56) References Cited

U.S. PATENT DOCUMENTS

| | | | |
|---|---|---|---|
| 4,414,575 A | | 11/1983 | Yamamoto et al. |
| 4,458,145 A | * | 7/1984 | Voles ........................... 250/204 |
| 4,492,449 A | | 1/1985 | Oinoue et al. |
| 4,496,832 A | | 1/1985 | Sakai et al. |
| 4,509,842 A | * | 4/1985 | Taniguchi et al. ............. 396/81 |
| 4,527,053 A | | 7/1985 | Kinoshita et al. |
| 4,540,881 A | * | 9/1985 | Hayashi et al. ........... 250/201.7 |
| 4,562,345 A | * | 12/1985 | Aoki et al. ................ 250/201.8 |
| 4,908,645 A | * | 3/1990 | Higashihara et al. ........... 396/95 |
| 5,146,071 A | * | 9/1992 | Ookubo et al. ........... 250/201.2 |
| 5,574,536 A | * | 11/1996 | Kusaka et al. .................. 396/96 |
| 6,134,390 A | * | 10/2000 | Kasuya .......................... 396/77 |

| | | | |
|---|---|---|---|
| 2002/0114015 A1 | | 8/2002 | Fujii et al. |
| 2002/0171751 A1 | * | 11/2002 | Ohkawara ................... 348/347 |

FOREIGN PATENT DOCUMENTS

| | | |
|---|---|---|
| DE | 31 46 387 A1 | 11/1981 |
| DE | 691 20 455 T2 | 4/1991 |
| EP | 0 451 865 B1 | 6/1996 |

(Continued)

OTHER PUBLICATIONS

French Preliminary Search Report dated Jan. 6, 2005.

(Continued)

*Primary Examiner*—M. Lee
*Assistant Examiner*—Albert H Cutler
(74) *Attorney, Agent, or Firm*—Harness, Dickey & Pierce, P.L.C.

(57) ABSTRACT

In the auto focus system, focus evaluation values indicating a degree of sharpness of images are sought from a plurality of image pickup devices placed at positions of different light path lengths, a travel distance converging to zero as a focus of a picture-taking lens approaches a focusing position is sought by using a difference or a ratio between the two focus evaluation values, and the focus is moved to a new moving target position which is a value of a current moving target position having the travel distance added thereto so as to securely move the focus to the focusing position by stable operation of the focus suited to characteristics of the focus evaluation values.

6 Claims, 8 Drawing Sheets

FOREIGN PATENT DOCUMENTS

| | | |
|---|---|---|
| JP | 62-299926 | 12/1987 |
| JP | 08-152550 | 6/1996 |
| JP | 08-160284 | 6/1996 |
| JP | 09-113794 | 5/1997 |
| JP | 2002-189164 | 7/2002 |
| WO | WO 02/099495 | 12/2002 |
| WO | WO 02/099496 | 12/2002 |
| WO | WO 02/099497 | 12/2002 |
| WO | WO 02/099498 | 12/2002 |

OTHER PUBLICATIONS

Office Action for corresponding Japanese Application No. 2002-243359 dated Oct. 15, 2007 and English translation thereof.

German Office Action dated Sep. 4, 2008 for corresponding German Application No. 103 38 249.6 and English translation thereof.

* cited by examiner

AUTO FOCUS SYSTEM

BACKGROUND OF THE INVENTION

1. Field of the Invention

The present invention relates to an auto focus system, and in particular, to the auto focus system for controlling a focus of a picture-taking lens by a contrast method.

2. Description of the Related Art

An auto focus of a video camera and so on is generally depending on a contrast method. According to the contrast method, high frequency components of picture signals in a certain range (focus area) of the picture signals obtained from an image pickup device are integrated to be a focus evaluation value, and a focus adjustment is automatically performed so that the focus evaluation value becomes maximum (local maximum). It is thereby possible to obtain the best focus (focusing) for maximizing a degree of sharpness (contrast) of an image picked up by the image pickup device.

A so-called mountain climbing method is widely known as a method of setting a focus at a focusing position (a local maximum point of the focus evaluation value). According to this method, a direction in which the focus evaluation value increases is determined by comparing the focus evaluation values at two different points on moving the focus, and the focus is moved in that direction so that if the focus evaluation value turns to decrease from increase, the focus is returned to the position before the focus evaluation value decreased so as to set the focus at the local maximum point of the focus evaluation value.

In the case of the above-mentioned mountain climbing method, there is a drawback that an increasing direction of the focus evaluation value and focusing cannot be determined without actually moving the focus. Therefore, there is a proposed method whereby a focus state (front focus, rear focus or just focus) of a picture-taking lens is determinable without moving the focus by placing a plurality of image pickup devices at positions of different light path lengths (e.g., WO 02/099495 A1, WO 02/099496 A1, WO 02/099497 A1 and WO 02/099498 A1, which were, at the time the present invention was made, not published and not publicly known). According to this focus state determination method, it is possible to immediately know a current focus state from a magnitude relation among current focus evaluation values obtained from the image pickup devices so as to determine a moving direction of the focus and the just focusing without moving the focus. Therefore, the auto focus using this method has advantages such as being able to promptly set the focus at the focusing position.

In the case of moving a focus to a focusing position based on focus evaluation values obtained from a plurality of image pickup devices as mentioned above, a focus state is determined based on the focus evaluation values. Nevertheless, the focus evaluation values are not reflected on the control over movement of the focus until it is moved to the focusing position. For this reason, there is a problem that the movement of the focus until it is moved to the focusing position is unstable since it is not suited to characteristics of the focus evaluation values which are different depending on a state of an object and a picture-taking lens.

SUMMARY OF THE INVENTION

The present invention has been implemented in consideration of such circumstances, and an object thereof is to provide an auto focus system capable of securely moving the focus of the picture-taking lens to the focusing position by stable operation.

In order to attain the above described object, the present invention is directed to an auto focus system, comprising: two image pickup devices which pick up images of object light incident on a picture-taking lens and are arranged at positions of different light path lengths; a focus evaluation value generation device which generates a focus evaluation value indicating a degree of sharpness of the image picked up by each of the image pickup devices; and a focus control device which moves a focus of the picture-taking lens to a focusing position by controlling the focus of the picture-taking lens so that two focus evaluation values generated by the focus evaluation value generation device corresponding to the two image pickup devices become equal to each other, wherein the focus control device seeks, as a travel distance of the focus, a value of a function converging to zero as the two focus evaluation values approach to each other, and moves the focus to a new moving target position which is a value of a current moving target position having the travel distance added thereto so as to move the focus to the focusing position.

The function may include, as a variable, a difference between the two focus evaluation values and converge to zero as the difference between the two focus evaluation values approaches zero. The function can be a formula in which the variable indicating the difference between the two focus evaluation values is multiplied by a predetermined gain value.

Alternatively, the function may include, as a variable, a ratio between the two focus evaluation values and converge to zero as the ratio between the two focus evaluation values approaches one. The function can be a formula in which the variable indicating the ratio between the two focus evaluation values has one subtracted therefrom and is multiplied by a predetermined gain value.

According to the present invention, the travel distance converging to zero as the focus of the picture-taking lens approaches the focusing position is sought by using the difference or ratio between the two focus evaluation values obtained from two image pickup devices, and the focus is moved to the new moving target position which is the value of the current moving target position having the travel distance added thereto so that it will be possible to securely move the focus to the focusing position by stable operation of the focus suited to the characteristics of the focus evaluation values.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Hereafter, preferred embodiments of an auto focus system according to the present invention will be described in detail according to the attached drawings.

Figure 1:
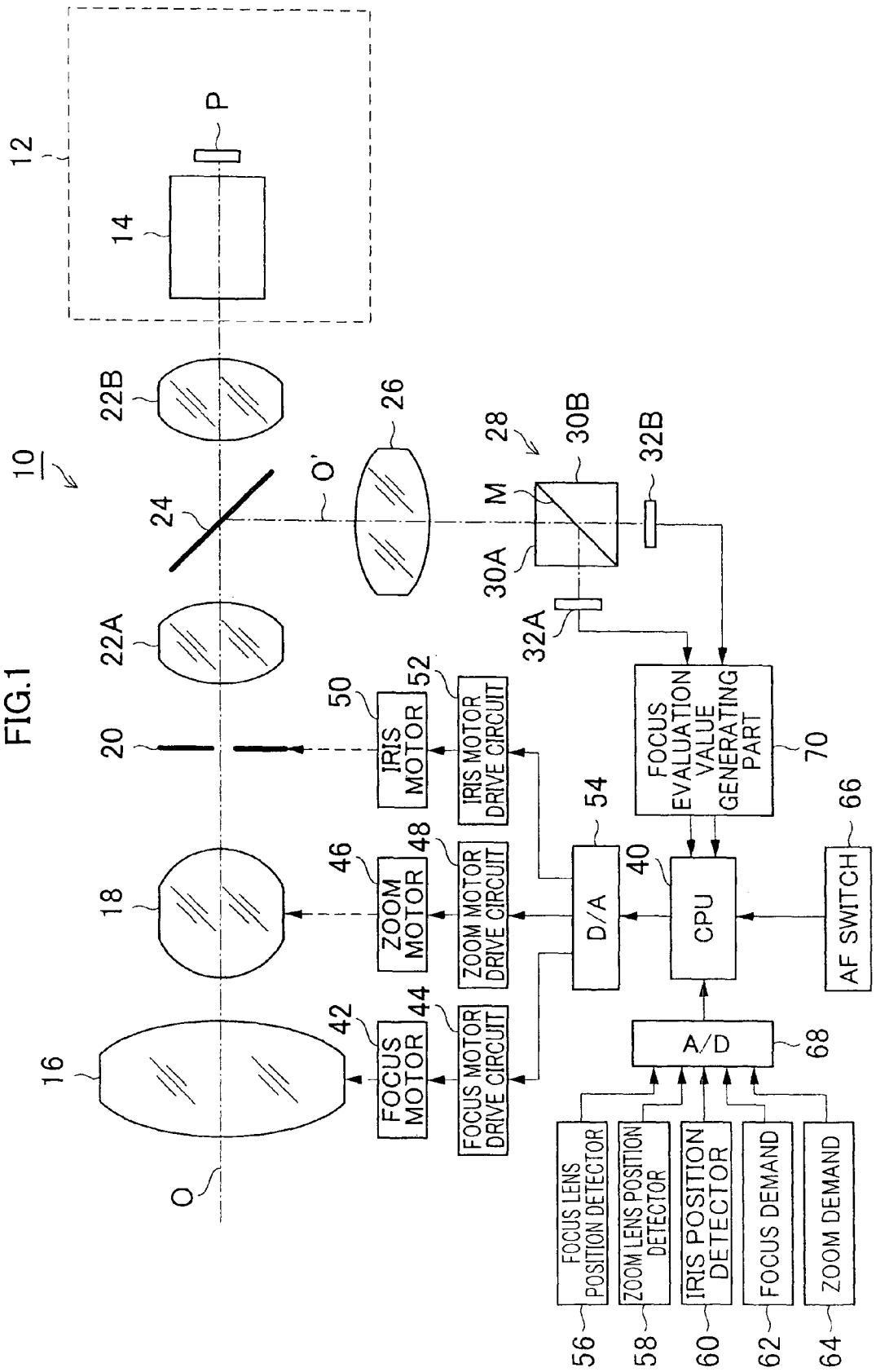
FIG. 1 is a block diagram of a TV camera system to which an auto focus system according to the present invention is applied.

FIG. 1 is a block diagram of a TV camera system to which the auto focus system according to an embodiment of the present invention is applied. As shown in FIG. 1, this TV camera system is comprised of a lens apparatus 10, a camera body 12 and so on. The camera body 12 has image pickup devices (hereafter, referred to as video image pickup devices) for shooting an image for broadcasting and outputting or recording on a record medium a picture signal in a predetermined format, necessary circuits and so on mounted thereon.

The lens apparatus 10 is detachably mounted on the camera body 12, and is mainly comprised of an optical system (picture-taking lens) and a control system. First, to describe a configuration of the picture-taking lens, it has a focus lens (group) 16, a zoom lens (group) 18, an iris 20, a relay lens (relay optical system) comprised of a front side relay lens 22A and a back side relay lens 22B. A semitransparent mirror 24 for branching object light for determining a focus state from the object light incident on the picture-taking lens is placed between the front side relay lens 22A and the back side relay lens 22B of the relay optical system.

The semitransparent mirror 24 is mounted to be inclined approximately 45 degrees to an optical axis O of the picture-taking lens so that a part of the object light (light volume of ⅓ for instance) which passed through the front side relay lens 22A is reflected thereon at a right angle as the object light for determining the focus state.

The object light transmitted through the semitransparent mirror 24 is emitted as the object light for the image from a back end side of the picture-taking lens, and then gets incident on an image pickup part 14 of the camera body 12. The configuration of the image pickup part 14 will be omitted. The object light which got incident on the image pickup part 14 is decomposed into three colors of red light, green light and blue light by a color separation optical system for instance, and gets incident on an image pickup surface of the video image pickup device of each color. Thus, a color image for broadcasting is shot. A focus surface P in the drawing is an optically equivalent position to the image pickup surface of each video image pickup device shown on the optical axis O of the picture-taking lens.

The object light reflected on the semitransparent mirror 24 proceeds along an optical axis O' which is vertical to the optical axis O as the object light for determining the focus state, and then gets incident on a relay lens 26. It is collected by the relay lens 26 and then gets incident on a focus state determination part 28.

The focus state determination part 28 is comprised of two prisms 30A, 30B constituting a light division optical system and a pair of image pickup devices for determining the focus state 32A, 32B (hereafter, referred to as focus state determining image pickup devices 32A, 32B).

As described above, the object light reflected on the semitransparent mirror 24 proceeds along the optical axis O', and gets incident on the first prism 30A. It is equally divided into reflected light and transmitted light on a semitransparent mirror surface M of the first prism 30A. The reflected light thereof gets incident on the image pickup surface of the focus state determining image pickup device 32A on one side, and the transmitted light gets incident on the focus state determining image pickup device 32B on the other side. Each image pickup surface of the focus state determining image pickup devices 32A and 32B has the light volume of ⅙ of the entire object light incident on the picture-taking lens incident thereon, for instance.

Figure 2:
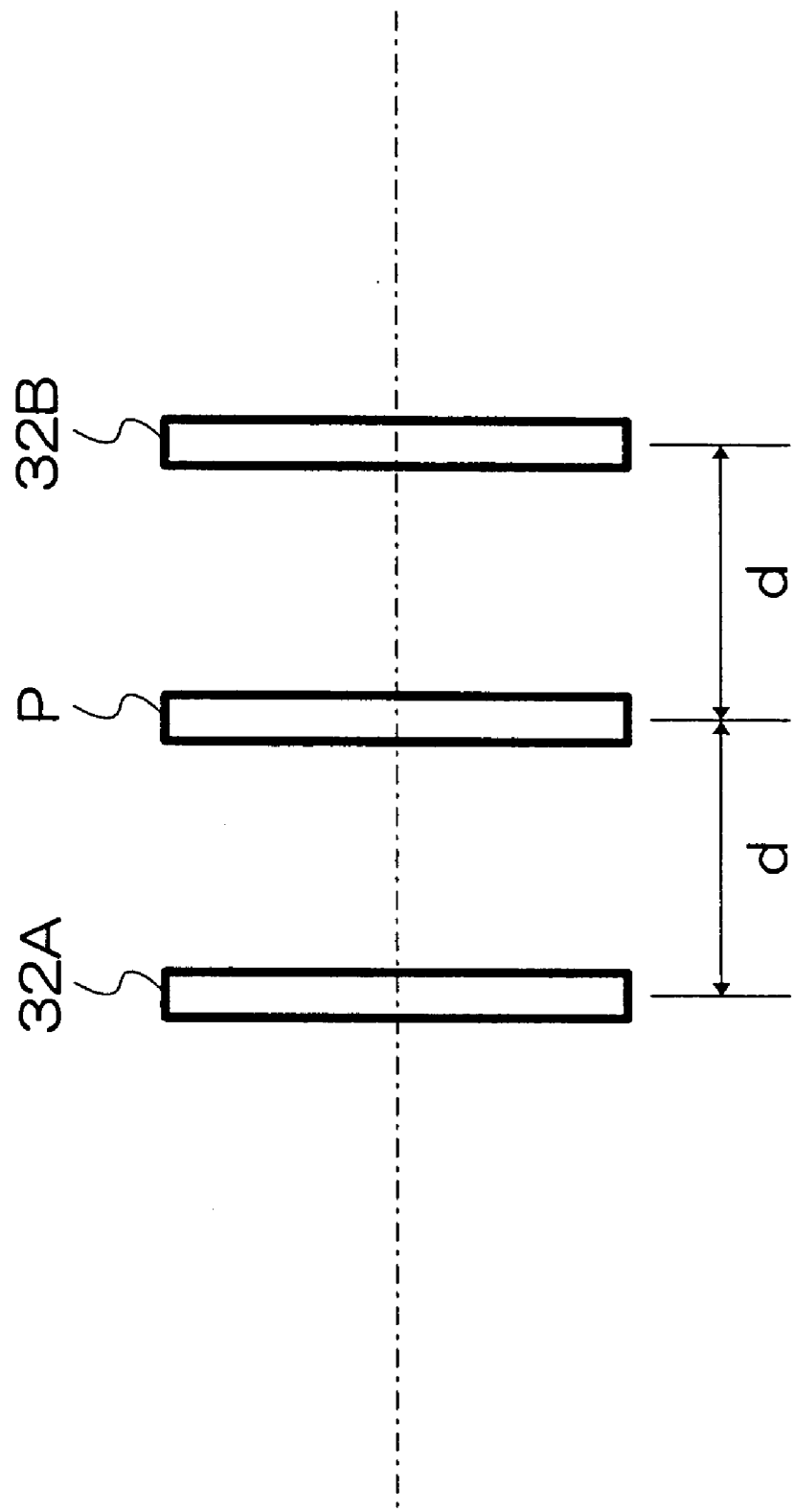
FIG. 2 is a diagram showing an optical axis of object light incident on a video image pickup device and the optical axis of object light incident on a pair of focus state determining image pickup devices on the same straight line.

FIG. 2 is a diagram showing the optical axis of the object light incident on the video image pickup device of the camera body 12 and the optical axis of the object light incident on the pair of focus state determining image pickup devices 32A, 32B on the same straight line. As shown in FIG. 2, the light path length of the object light incident on the focus state determining image pickup device 32A on one side is set to be shorter than that incident on the focus state determining image pickup device 32B on the other side, and the light path length of the object light incident on the image pickup surface (focus surface P) of the video image pickup device is set to have an intermediate length between them. To be more specific, the pair of focus state determining image pickup devices 32A, 32B (image pickup surfaces thereof) are placed to have an equal distance (d) frontward and backward from the image pickup surface (focus surface P) of the video image pickup device, respectively.

Therefore, the object light for determining the focus state branched by the semitransparent mirror 24 has the image thereof picked up at the equal distance (d) frontward and backward from the image pickup surface (focus surface P) of the video image pickup device by the pair of focus state determining image pickup devices 32A, 32B. As will be described later, the focus state determining image pickup devices 32A, 32B obtain the picture signal for determining the focus state (auto focus control), and they are CCDs for picking up a black and white image according to this embodiment since they do not need to pick up a color image.

To describe the control system of the lens apparatus 10 next, the focus lens 16, zoom lens 18 and iris 20 are linked to a focus motor 42, a zoom motor 46 and an iris motor 50 shown in FIG. 1 via a power transmission mechanism (not shown), respectively. If the focus motor 42 is driven, the focus lens 16 moves in an optical axis direction to change a focus position (shooting distance) of the picture-taking lens. If the zoom motor 46 is driven, the zoom lens 18 moves in the optical axis direction to change zoom magnification of the picture-taking lens. If the iris motor 50 is driven, a diaphragm blade of the iris 20 opens and closes to change a diaphragm diameter (diaphragm value).

The motors 42, 46 and 50 are given drive voltages from a focus motor drive circuit 44, a zoom motor drive circuit 48 and an iris motor drive circuit 52, respectively. The drive circuits 44, 48 and 52 are given control signals outputted from a CPU 40 mounted on the lens apparatus 10 via a D/A converter 54.

The control signals outputted from the CPU 40 indicate voltage values corresponding to rotational speeds of the motors to be driven, that is, working speeds of subjects to be driven (focus lens 16, zoom lens 18 and iris 20). If the voltage values are converted into analog signals by the D/A converter 54 and given to the corresponding drive circuits 44, 48 and 52, the voltages are amplified by the drive circuits 44, 48 and 52, and the amplified voltages are applied as the drive voltages to the corresponding motors 42, 46 and 50. Thus, the rotational speeds of the motors 42, 46 and 50 are controlled by the CPU 40.

Current positions of the focus lens 16, zoom lens 18 and iris 20 are determined by a focus lens position detector 56, zoom lens position detector 58 and an iris position detector 60 such as potentiometers, respectively, and determination signals determined from the position detectors 56, 58 and 60 are given to the CPU 40 via an A/D converter 68.

Therefore, as for the process of the CPU 40, it is possible, by controlling the rotational speeds of the motors 42, 46 and 50 as described above, to control the working speeds of the focus lens 16, zoom lens 18 and iris 20 to be desirable speeds. It is also thereby possible to control setup positions of the focus lens 16, zoom lens 18 and iris 20 to be desirable setup positions by controlling the rotational speeds of the motors 42, 46 and 50 while reading the current positions of the focus lens 16, zoom lens 18 and iris 20 by means of the determination signals from the position detectors 56, 58 and 60.

In general, the focus and zoom of the picture-taking lens can be manually controlled by an operator by connecting a controller such as a focus demand 62 and/or a zoom demand 64 to the lens apparatus 10. For instance, the focus demand 62 outputs a focus instruction signal (focus demand data) of the voltage corresponding to a rotational position of a manual operating member (focus ring), which is given to the CPU 40 via the A/D converter 68. For instance, by rendering the value of the focus demand data as the value indicating a moving target position of the focus lens 16, the CPU 40 outputs via the D/A converter 54 to the focus motor drive circuit 44, as described above, the control signal for providing an instruction to move at a moving speed according to a difference between the moving target position and the current position (focus position data) obtained from the focus lens position detector 56. Thus, the focus lens 16 moves to the moving target position as instructed by the focus demand 62 and stops.

The zoom demand 64 generally provides to the CPU 40 the voltage corresponding to a rotational position of an operating member (e.g., a thumb ring) as the value indicating a moving target speed of the zoom lens 18, and the CPU 40 outputs to the zoom motor drive circuit 48 the control signal for providing an instruction to move at that moving target speed so as to move the zoom lens 18 at the moving target speed as instructed by the zoom demand 64. As for the iris 20, the camera body 12 generally provides to the CPU 40 the instruction signal for directing an operation target position of the iris 20, and the CPU 40 controls the position of the iris 20 to be at that operation target position.

As for focus control of the picture-taking lens, there are manual focus (MF) control using the focus demand 62 and auto focus (AF) control based on the picture signals from the focus state determining image pickup devices 32A, 32B. An AF switch 66 for switching between such MF control and AF control is provided to the lens apparatus 10 or the focus demand 62. An on/off state of the AF switch 66 is determined by the CPU 40, and the MF control is exerted in the case where the AF switch 66 is off so that, as described above, the focus lens 16 is controlled based on the focus instruction signal (focus demand data) from the focus demand 62.

In the case where the AF switch 66 is turned on, the AF control is exerted. To be more specific, the images (pictures) picked up by the pair of focus state determining image pickup devices 32A, 32B are outputted as the picture signals for sequentially transmitting each pixel value thereof along a plurality of scan lines (horizontal lines) constituting one screen, and are inputted to a focus evaluation value generating part 70. Although the configuration and process of the focus evaluation value generating part 70 will be described later, the focus evaluation value generating part 70 generates from the inputted picture signals the focus evaluation value indicating whether a contrast (degree of sharpness) of each image picked up by the focus state determining image pickup devices 32A, 32B is high or low so as to provide the generated focus evaluation values to the CPU 40. The focus evaluation value generated based on the picture signal from the focus state determining image pickup device 32A is called the focus evaluation value of a channel A (chA), and the focus evaluation value generated based on the picture signal from the focus state determining image pickup device 32B is called the focus evaluation value of a channel B (chB). As will be described in detail later, the CPU 40 obtains the focus evaluation values of chA and chB obtained from the focus evaluation value generating part 70, and determines the focus state (front focus, rear focus or just focus) of the picture-taking lens based on the obtained focus evaluation values and also controls the position of the focus lens 16 so that the focus state of the picture-taking lens will be focusing.

Figure 3:
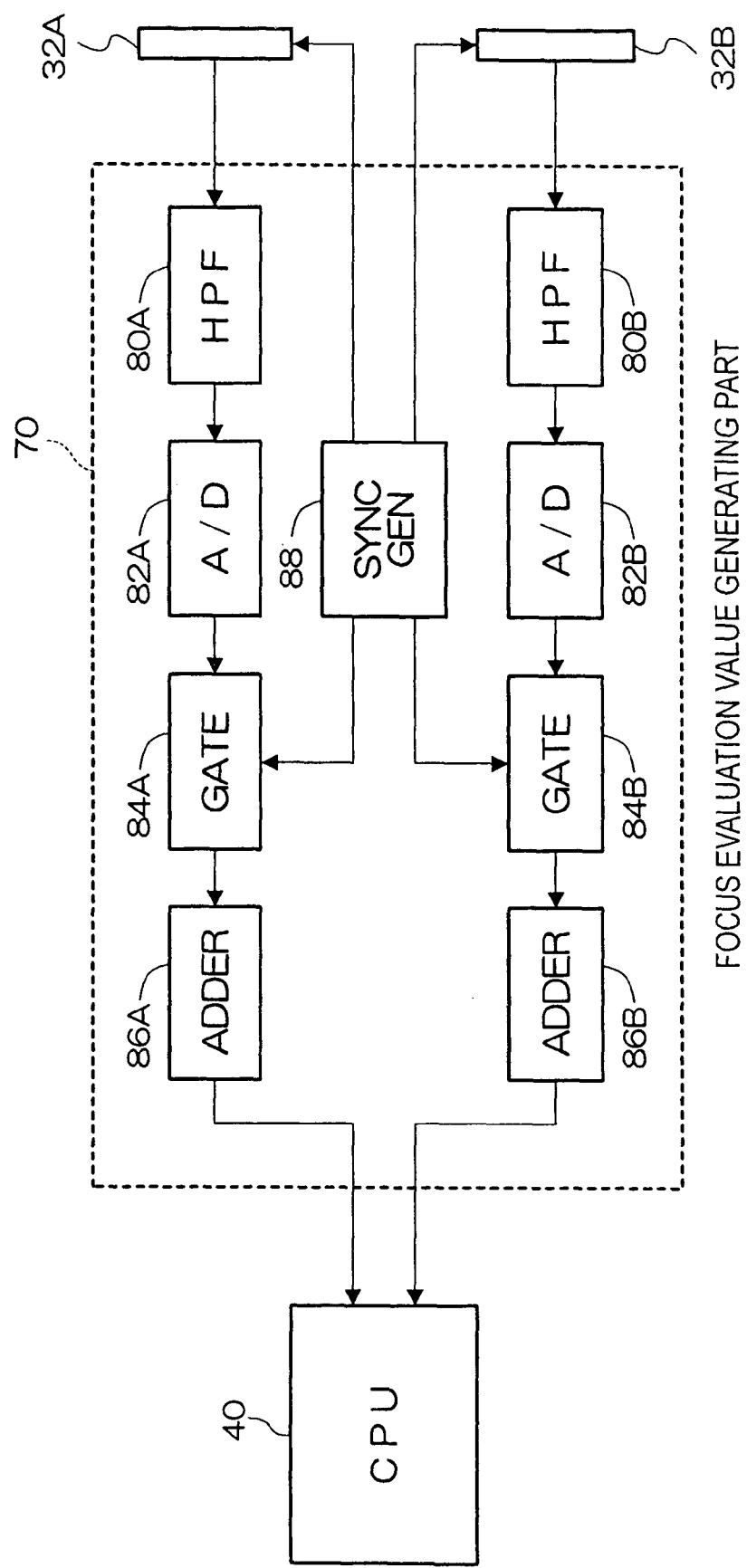
FIG. 3 is a block diagram showing a configuration of a focus evaluation value generating part.

The AF control in the camera system constituted as above will be described in detail hereafter. First, the configuration and process of the focus evaluation value generating part 70 will be described. As shown in FIG. 3, the picture signal outputted from each of the focus state determining image pickup devices 32A, 32B is inputted to high-pass filters (HPFs) 80A, 80B of the focus evaluation value generating part 70. Here, both the focus state determining image pickup devices 32A and 32B are the CCDs for picking up the black and white image, and so the picture signal outputted from each of the focus state determining image pickup devices 32A and 32B is a luminance signal indicating a luminance value of the pixels constituting each screen.

The picture signals inputted to the HPFs 80A, 80B have high frequency components thereof extracted by the HPFs 80A, 80B, and the signals of the high frequency components are subsequently converted into digital signals by A/D converters 82A, 82B. Of the digital signals of one screen (equivalent to one field) of the images picked up by the focus state determining image pickup devices 32A, 32B, only the digital signals corresponding to the pixels in a predetermined focus area (the central portion of the screen, for instance) are extracted by gate circuits 84A, 84B so that the values of the digital signals in an extracted range are added by adders 86A, 86B. Thus, a total of the high frequency component values of the picture signals in the focus area is acquired. The values acquired by the adders 86A, 86B are the focus evaluation values indicating whether the degree of sharpness of the images in the focus area is high or low. The focus evaluation values acquired by the adder 86A are provided to the CPU 40 as the focus evaluation values of channel A (chA), and the focus evaluation values acquired by the adder 86B are provided thereto as the focus evaluation values of the channel B (chB).

Various synchronization signals are provided to the focus state determining image pickup devices 32A, 32B and the circuits such as gate circuits 84A, 84B from a synchronization signal generating circuit 88 shown in FIG. 3, and synchronization of the processing of the circuits is implemented. The synchronization signal generating circuit 88 provides to the CPU 40 a vertical sync signal (V signal) per field of the picture signal.

Next, a description will be given of determination of the focus state and control over the focus (focus lens 16) based on the focus evaluation values. It is possible, by the focus evaluation values of the chA and chB obtained from the focus evaluation value generating part 70 as described above, to determine the current focus state of the picture-taking lens against the image pickup surface (focus surface P) of the video image pickup device.

Figure 4:
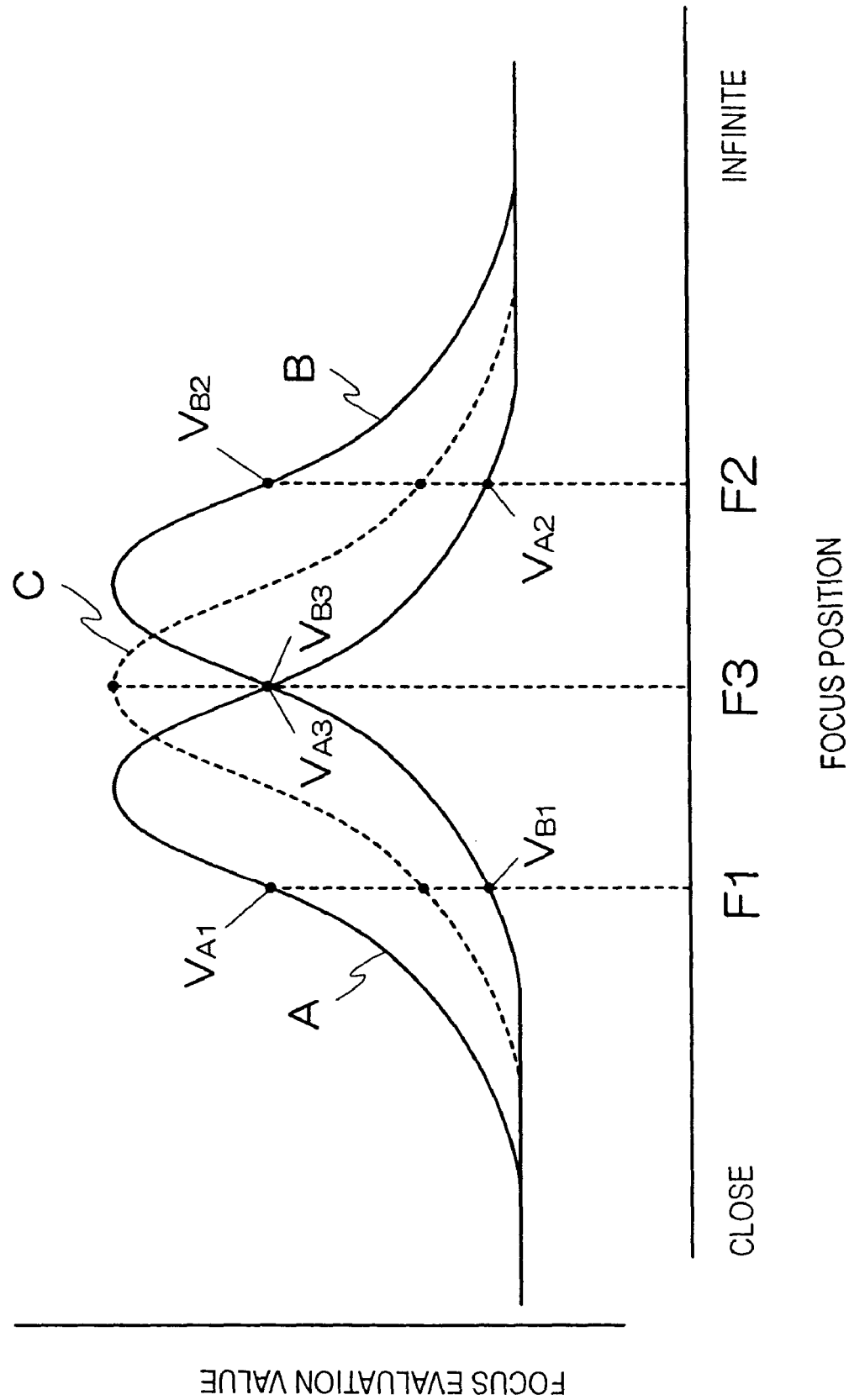
FIG. 4 is a diagram showing an appearance of the focus evaluation values against focus positions when shooting a certain object by taking focus positions of a picture-taking lens as a horizontal axis and the focus evaluation values as a vertical axis.

FIG. 4 is a diagram showing an appearance of the focus evaluation values against the focus positions when shooting a certain object by taking the positions of the focus lens 16 of the picture-taking lens (focus positions) as a horizontal axis and the focus evaluation values as a vertical axis. A curve C shown by a dotted line in the drawing shows the focus evaluation values against the focus positions on the assumption that the focus evaluation values were acquired by the picture signals from the video image pickup devices (or the image pickup devices placed at positions coupled to the video image pickup devices). Curves A and B shown in solid line in the drawing show the focus evaluation values of chA and chB obtained from the focus state determining image pickup devices 32A, 32B respectively against the focus positions. In FIG. 4, a position F3 at which the focus evaluation value of the curve C becomes maximum (local maximum) is the focusing position.

In the case where the focus position of the picture-taking lens is set at F1 in FIG. 4, the focus evaluation value $V_{A1}$ of chA becomes the value corresponding to the position F1 of the curve A, and the focus evaluation value $V_{B1}$ of chB becomes the value corresponding to the position F1 of the curve B. In this case, the focus evaluation value $V_{A1}$ of chA becomes larger than the focus evaluation value $V_{B1}$ of chB, which shows that the focus position is set on a closer side than the focusing position (F3), that is, a state of the front focus.

In the case where the focus position of the picture-taking lens is set at F2 in FIG. 4, the focus evaluation value $V_{A2}$ of chA becomes the value corresponding to the position F2 of the curve A, and the focus evaluation value $V_{B2}$ of chB becomes the value corresponding to the position F2 of the curve B. In this case, the focus evaluation value $V_{A2}$ of chA becomes smaller than the focus evaluation value $V_{B2}$ of chB, which shows that the focus position is set on a more infinite side than the focusing position (F3), that is, a state of the rear focus.

As opposed to this, in the case where the focus position of the picture-taking lens is set at F3, that is, the focusing position, the focus evaluation value $V_{A3}$ of chA becomes the value corresponding to the position F3 of the curve A, and the focus evaluation value $V_{B3}$ of chB becomes the value corresponding to the position F3 of the curve B. In this case, the focus evaluation value $V_{A3}$ of chA becomes equal to the focus evaluation value $V_{B3}$ of chB, which shows that the focus position is set at the focusing position (F3).

Thus, it is possible, by the focus evaluation values of chA and chB obtained from the focus evaluation value generating part 70, to determine whether the current focus state of the picture-taking lens is the front focus, rear focus or just focus.

Therefore, it is possible to move the focus lens 16 to the focusing position by controlling the position of the focus lens 16 based on the focus evaluation values of chA and chB obtained from the focus evaluation value generating part 70. To be more specific, in the case where the focus evaluation values of chA and chB are in the state to be determined as the front focus, the focus lens 16 is moved in the infinite direction. In the case where they are in the state to be determined as the rear focus, it is moved in the close direction. In the case where they are in the state to be determined as the just focus, the focus lens 16 can be moved to the focusing position by stopping it at that position.

The process of the CPU 40 corresponding to the above description will be concretely described as follows. Assuming that the focus evaluation value of chA obtained from the focus evaluation value generating part 70 is AFV_A, and that of chB is AFV_B, in the case of AFV_A>AFV_B which means the state of the front focus, the CPU 40 changes a currently set moving target position of the focus lens 16 toward the infinite side by a travel distance (positive value) mentioned later, and outputs to the focus motor drive circuit 44 via the D/A converter 54 the control signal for moving the focus lens 16 to the new moving target position. Inversely, in the case of AFV_A<AFV_B which means the state of the rear focus, the CPU 40 changes a currently set moving target position of the focus lens 16 toward the close side by the travel distance (negative value) mentioned later, and outputs to the focus motor drive circuit 44 via the D/A converter 54 the control signal for moving the focus lens 16 to the new moving target position. This process is repeated, and in the case where it becomes AFV_A=AFV_B, the movement of the focus lens 16 is stopped. Thus, the focus lens 16 moves to the just focusing position.

Here, assuming that value of the determination signal (focus position data) indicating the current position of the focus lens 16 obtained from the focus lens position detector 56 is F_POSI, and the moving target position of the focus lens 16 set as described above is AF_CTRL, the CPU 40 sets the value of the moving target position AF_CTRL minus the current position F_POSI, that is, AF_CTRL−F_POSI as the value F_SPEED of the control signal to be outputted to the focus motor drive circuit 44. The control signal to be outputted to the focus motor drive circuit 44 is the value corresponding to the rotational speed of the focus motor 42 (moving speed of the focus lens 16) to be directed to the focus motor drive circuit 44. The value F_SPEED of the control signal set as described above is outputted to the focus motor drive circuit 44 so that the focus lens 16 moves at the speed corresponding to the difference between the moving target position AF_CTRL and the current position F_POSI (AF_CTRL−F_POSI).

Next, a description will be given of the travel distance to be added to the current moving target position in the case of setting the new moving target position of the focus lens 16 as described above. As described above, the difference between the current position F_POSI and the moving target position AF_CTRL of the focus lens 16 is corresponding to the moving speed of the focus lens 16. When setting the new moving target position AF_CTRL, the larger the travel distance to be added to the current moving target position is, the higher the moving speed of the focus lens 16 becomes, and the smaller the travel distance is, the lower the moving speed becomes.

In the case of moving the focus lens 16 to the focusing position, it is necessary, for the sake of securely stopping the focus lens 16 at the focusing position by stable operation, to lower the moving speed of the focus lens 16 by reducing the travel distance as it gets closer to the focusing position so that, when arriving at the focusing position, the travel distance becomes zero and the moving speed of the focus lens 16 becomes zero.

Thus, the CPU 40 acquires the difference ΔAFV (=AFV_A−AFV_B) between the focus evaluation values of chA and chB, and sets as the travel distance the value ΔAFV× AFG which is the difference ΔAFV (=AFV_A−AFV_B) multiplied by a predetermined AF gain AFG. Thus, in the case where the focus lens 16 arrives at the focusing position, that is, in the case where the difference ΔAFV between the focus evaluation values becomes zero (AFV_A=AFV_B), the travel distance ΔAFV×AFG becomes zero and the focus lens 16 stops at the focusing position. As is understandable from FIG. 4, when the focus lens 16 approaches the focusing position from around the focusing position, the difference $\Delta AFV$ between the focus evaluation values decreases and the travel distance $\Delta AFV \times AFG$ gradually becomes closer to zero so that the moving speed of the focus lens 16 is gradually reduced.

Instead of setting as the travel distance the value $\Delta AFV \times AFG$ which is the difference $\Delta AFV$ between the focus evaluation values of chA and chB multiplied by the predetermined AF gain AFG as described above, it is also possible to set the travel distance as follows. To be more specific, the CPU 40 first acquires a ratio $\Delta AFV = AFV\_A/AFV\_B$ between the focus evaluation value $AFV\_A$ of chA and the focus evaluation value $AFV\_B$ of chB. In the case of $AFV\_A > AFV\_B$ ($\Delta AFV > 1$) which means the state of the front focus (refer to FIG. 4), the travel distance is set as $(\Delta AFV - 1) \times AFG$. AFG indicates the value of the predetermined AF gain. In the case of $AFV\_A \leq AFV\_B$ ($\Delta AFV \leq 1$) which means the state of the rear focus (or the state of just focus), the travel distance is set as—$(1/\Delta AFV - 1) \times AFG$.

Thus, in the case where the focus lens 16 arrives at the focusing position, the travel distance becomes zero because it is $\Delta AFV = 1$, and the focus lens 16 stops at the focusing position. When the focus lens 16 approaches the focusing position from around the focusing position, $(\Delta AFV - 1)$ or $(1/\Delta AFV - 1)$ decreases and the travel distance gradually becomes closer to zero so that the moving speed of the focus lens 16 is gradually reduced. Furthermore, in the case of using the ratio $\Delta AFV = AFV\_A/AFV\_B$ between the focus evaluation values as an element for thus seeking the travel distance, the size of the focus evaluation value itself does not influence the travel distance (moving speed) so much so that more stable focus operation can be implemented.

Figure 5:
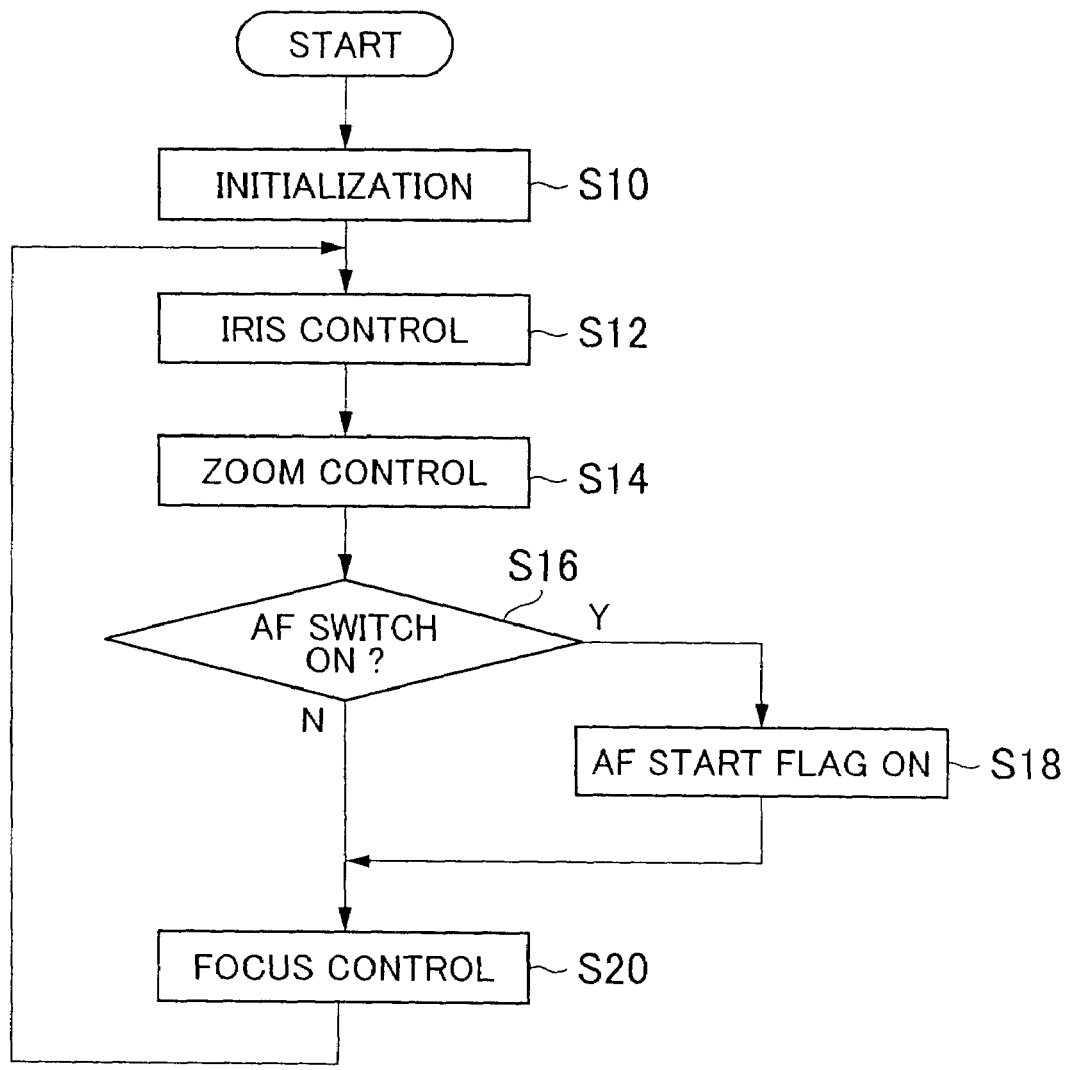
FIG. 5 is a flowchart showing a flow of the entire process in a CPU.

Next, an AF control procedure in the CPU 40 will be described. First, the entire process flow in the CPU 40 will be described by referring to the flowchart in FIG. 5. After performing required initialization (step S11), the CPU 40 performs iris control based on an iris instruction signal given by the camera body 12 (step S12). Next, it performs zoom control based on a zoom instruction signal from the zoom demand 64 (step S14).

Next, the CPU 40 determines whether or not the AF switch 66 is ON (step S16), and if determined as YES, it sets an AF start flag at ON (step S118), and then performs the focus control process (step S20). If determined as NO in the step S16, it performs the focus control process without setting the AF start flag at ON (step S20). When it finishes the focus control process in the step S20, it returns to the process in the step S12 and repeats the process from the step S12 to the step S20.

Figure 6:
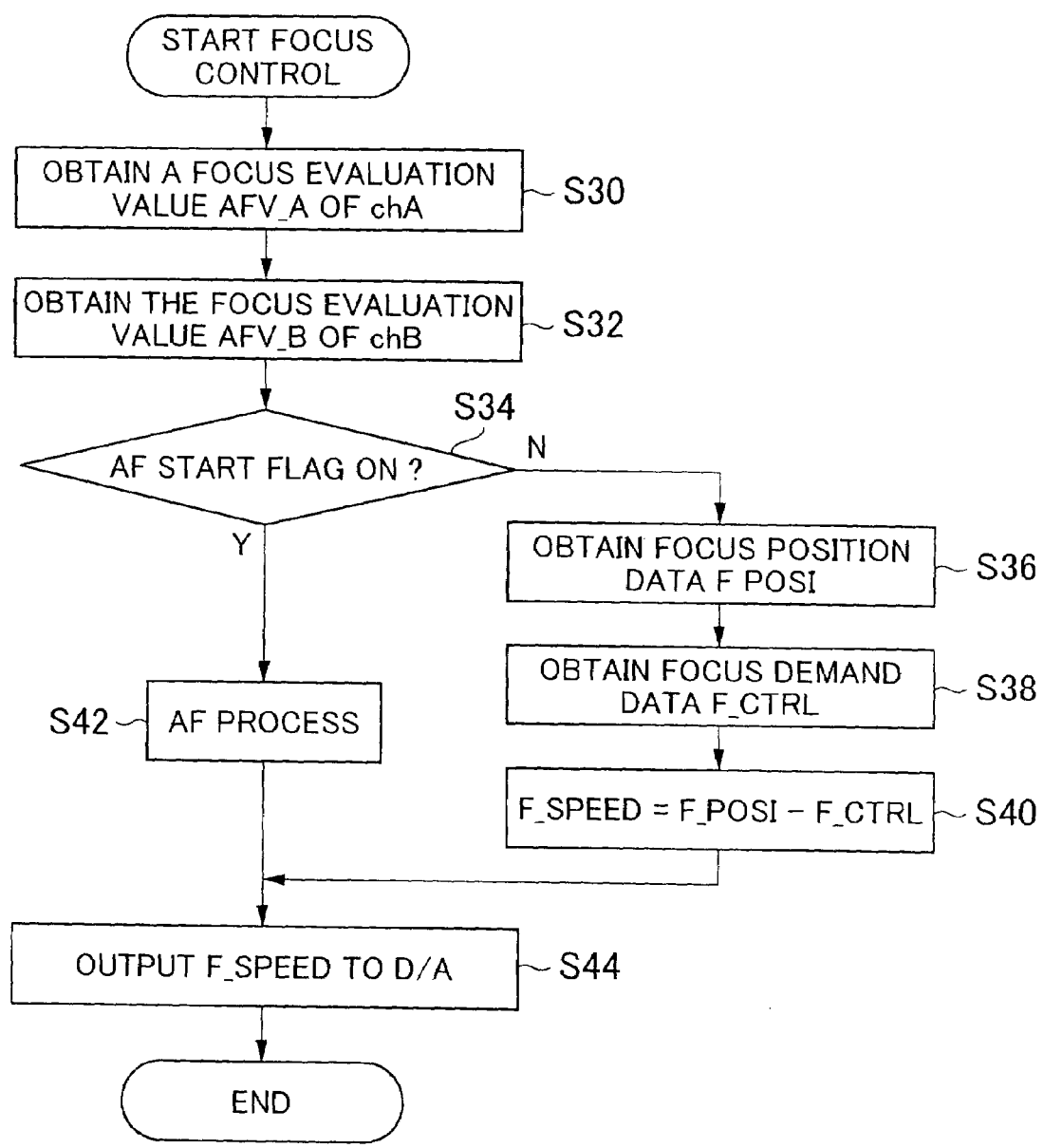
FIG. 6 is a flowchart showing a focus control procedure in FIG. 5.

FIG. 6 is a flowchart showing the focus control process in the step S20. In the case of performing the focus control process, the CPU 40 first acquires the focus evaluation value $AFV\_A$ of the focus state determining image pickup device 32A (chA) from the focus evaluation value generating part 70 (step S30), and also acquires the focus evaluation value $AFV\_B$ of the focus state determining image pickup device 32B (chB) (step S32).

Next, the CPU 40 determines whether or not the AF start flag is set at ON (step S34). If determined as NO, it performs the MF process.

In the case of the MF process, the CPU 40 obtains the focus position data F_POSI showing the current position of the focus lens 16 from the focus lens position detector 56 (step S36), and also obtains the focus demand data F_CTRL showing the moving target position of the focus lens 16 from the focus demand 62 (step S38). It acquires the difference F_POSI F_CTRL between the obtained focus position data F_POSI and the focus demand data F_CTRL, and sets that value as the moving speed F_SPEED for moving the focus lens 16 to the moving target position directed by the focus demand 62 (step S40). It outputs the moving speed F_SPEED as the control signal to the focus motor drive circuit 44 via the D/A converter 54 (step S44).

On the other hand, if determined as YES, that is, the AF start flag is ON in the step S34, the CPU 40 performs the AF process (step S42).

Figure 7:
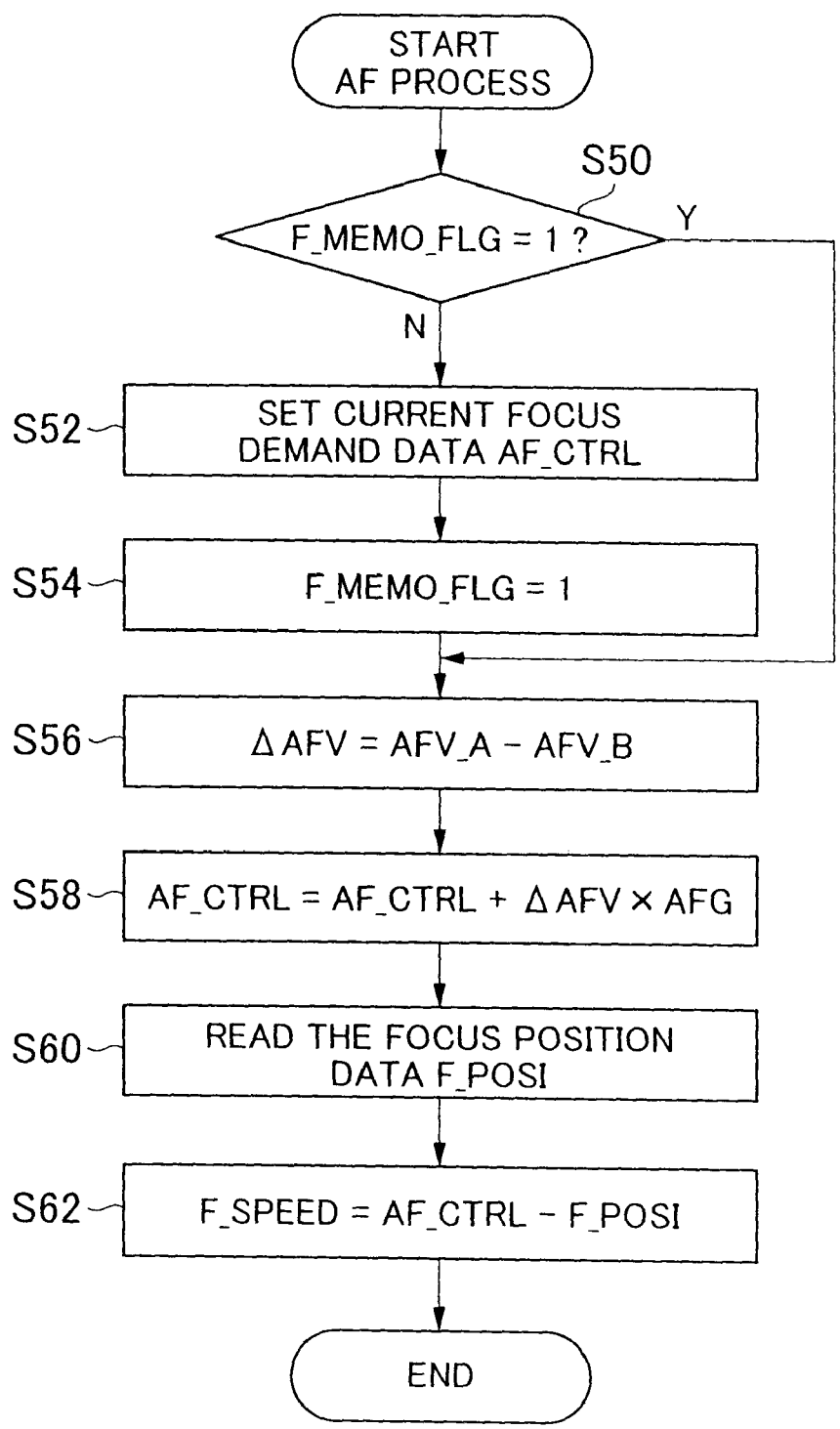
FIG. 7 is a flowchart showing a procedure of an AF process in FIG. 6.

FIG. 7 is a flowchart showing the AF procedure in the step S42. First, the CPU 40 determines whether or not a parameter F_MEMO_FLG is set at 1 (step S50). In the first process after shifting from the MF control to the AF control, it is determined as NO. In that case, the CPU 40 obtains the focus demand data indicating the current moving target position from the focus demand 62, and sets that data value as the initial (current) moving target position F_CTRL (step S52). Next, it sets the parameter F_MEMO_FLG at 1 (step S54). If determined as YES in the step S50, the process in the steps S52 and S54 is not performed.

Next, the CPU 40 acquires the difference $\Delta AFV = AFV\_A - AFV\_B$ between the focus evaluation value $AFV\_A$ of chA and the focus evaluation value $AFV\_B$ of chB obtained in the steps S30 and S32 in FIG. 6 (step S56).

It adds to the current moving target position AF_CTRL the value (travel distance) $\Delta AFV \times AFG$ which is the value of the $\Delta AFV$ multiplied by the predetermined AF gain AFG, and sets that value as a new moving target position AF_CTRL (step S58). To be more specific, it is AF_CTRL=AF_CTRL+$\Delta AFV \times AFG$.

Next, the CPU 40 reads the focus position data F_POSI showing the current position of the focus lens 16 from the focus lens position detector 56 (step S60), and sets the difference AF_CTRL−F_POSI between the focus position data F_POSI and the moving target position AF_CTRL set in the step S58 as the moving speed F_SPEED for moving the focus lens 16 (step S62). It returns to the flowchart in FIG. 6, and outputs the moving speed F_SPEED as the control signal to the focus motor drive circuit 44 via the D/A converter 54 (step S44).

Through the above process, the focus lens 16 moves to the focusing position at the moving speed according to a focal distance and an F value of the picture-taking lens.

Figure 8:
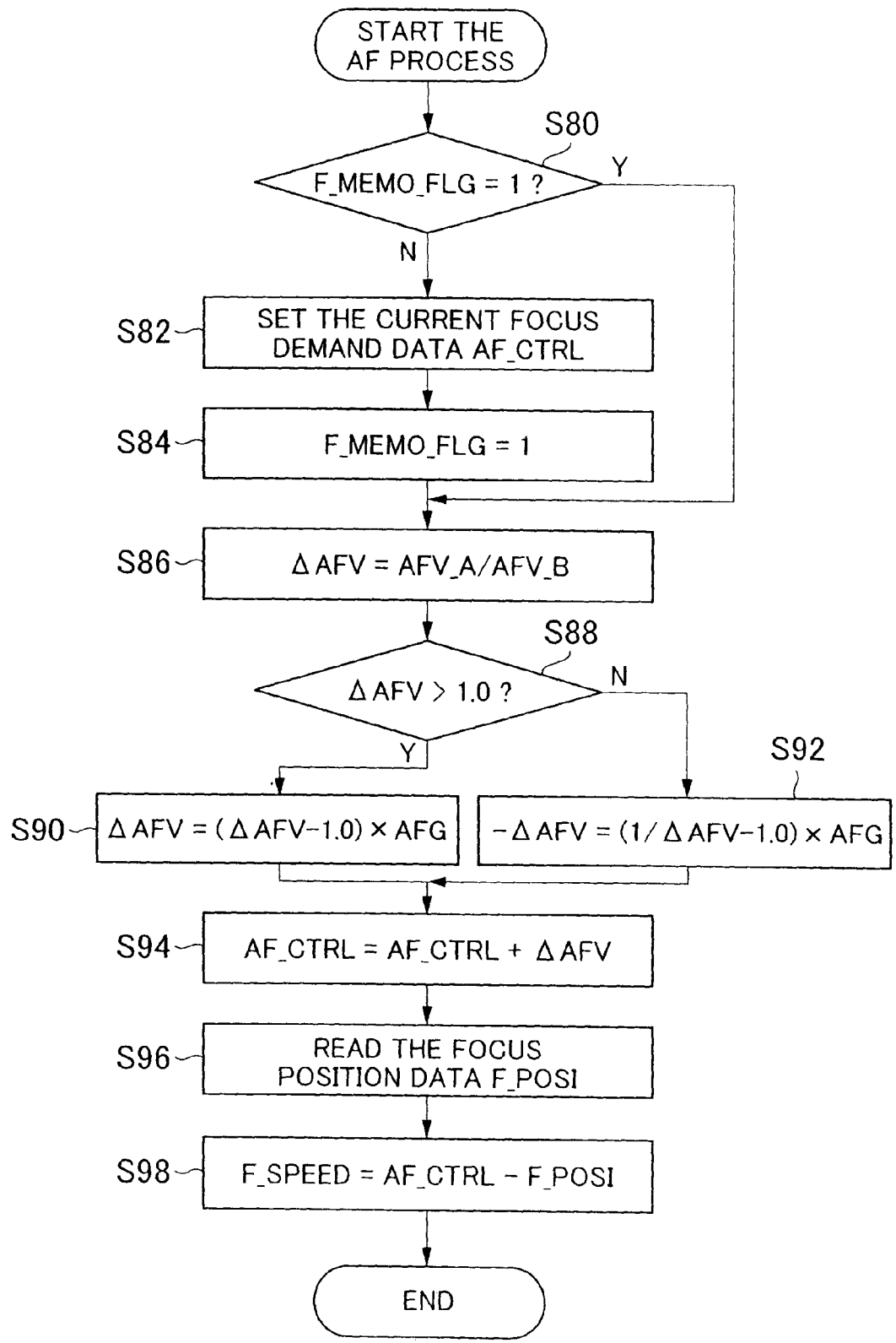
FIG. 8 is a flowchart showing the procedure of the AF process in another form.

Next, a description will be given by referring to the flowchart in FIG. 8 of the AF process in the case where the element for setting the travel distance is the ratio $\Delta AFV = AFV\_A/AFV\_B$ between the focus evaluation value $AFV\_A$ of chA and the focus evaluation value $AFV\_B$ of chB as described above instead of the difference $\Delta AFV = AFV\_A - AFV\_B$ between the focus evaluation value $AFV\_A$ of chA and the focus evaluation value $AFV\_B$ of chB as the AF process shown in FIG. 7. The process in steps S80 to S84 in the flowchart in FIG. 8 is just the same as the process in steps S50 to S54 in FIG. 7, and so the description will start from the process in a step S86 in FIG. 8.

After performing the process in the steps S80 to S84, the CPU 40 then acquires the ratio $\Delta AFV = AFV\_A/AFV\_B$ between the focus evaluation value $AFV\_A$ of chA and the focus evaluation value $AFV\_B$ of chB obtained in the steps S30 and S32 in FIG. 6 (step S86).

The CPU 40 determines whether or not the ratio $\Delta AFV$ between the focus evaluation values is larger than 1.0 (step S88). If determined as YES, it is $\Delta AFV = (\Delta AFV - 1) \times AFG$ (step S90). If determined as NO, it is $-\Delta AFV = (1/\Delta AFV - 1.0) \times AFG$ (step S92). AFG indicates the value of the predetermined AF gain. The CPU 40 adds to the current moving target position AF_CTRL the acquired value (travel distance)

ΔAFV, and sets that value as the new moving target position AF_CTRL (step S94). To be more specific, it is AF_CTRL=AF_CTRL+ΔAFV.

Next, the CPU 40 reads the focus position data F_POSI showing the current position of the focus lens 16 from the focus lens position detector 56 (step S96), and sets the difference AF_CTRL−F_POSI between the focus position data F_POSI and the moving target position AF_CTRL set in the step S94 as the moving speed F_SPEED for moving the focus lens 16 (step S98). It returns to the flowchart in FIG. 6, and outputs the moving speed F_SPEED as the control signal to the focus motor drive circuit 44 via the D/A converter 54 (step S44).

The description of the above embodiment was given as to the case where the AF control is exerted by obtaining two focus evaluation values from the two focus state determining image pickup devices 32A, 32B. However, it is not limited thereto but, even in the case where the AF control is exerted based on three or more focus evaluation values obtained from three or more image pickup devices placed at positions of different light path lengths, the present invention is applicable by handling any two focus evaluation values as the focus evaluation values of chA and chB.

According to the above embodiment, as for the AF control, the moving target position of the focus lens 16 is set by the difference or ratio between the focus evaluation values of chA and chB, and the focus lens 16 is moved at the moving speed corresponding to the difference between the moving target position and current position. However, it is not limited thereto but it is also possible to directly set the moving speed by the difference or ratio between the focus evaluation values of chA and chB and move the focus lens 16 at that moving speed.

As for the above embodiment, the case of applying the present invention to a TV camera system was described as an example. However, it is not limited thereto but the present invention is also applicable to a video camera and a still camera for shooting a static image.

As described above, according to the auto focus system related to the present invention, the travel distance converging to zero as the focus of the picture-taking lens approaches the focusing position is sought by using the difference or ratio between the two focus evaluation values obtained from the two image pickup devices, and the focus is moved to the new moving target position which is the value of the current moving target position having the travel distance added thereto so that it will be possible to securely move the focus to the focusing position by the stable operation of the focus suited to the characteristics of the focus evaluation values.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An auto focus system, comprising:
two image pickup devices which pick up images of object light incident on a picture-taking lens and are arranged at positions of different light path lengths;
a focus evaluation value generation device which generates a focus evaluation value indicating a degree of sharpness of the image picked up by each of the image pickup devices; and
a focus control device which moves a focus of the picture-taking lens to a focusing position by controlling the focus of the picture-taking lens so that two focus evaluation values generated by the focus evaluation value generation device corresponding to the two image pickup devices, respectively, become equal to each other, wherein
the focus control device acquires a ratio (ΔAFV) between the two focus evaluation values,
determines a travel distance by multiplying the ΔAFV with a predetermined automatic focusing gain (AFG), if the focus evaluation values indicate a front focus, the travel distance is determined by: $(\Delta AFV-1) \cdot AFG$,
adds the travel distance to a current moving target position to a set a new target position, and
sets a moving speed of the picture-taking lens based on the ΔAFV between the current moving target position and a current position of the picture-taking lens, and as the picture-taking lens approaches the new target position, the ΔAFV between the focus evaluation values decrease, and the travel distance approaches zero.

2. An auto focus system, comprising:
two image pickup devices which pick up images of object light incident on a picture-taking lens and are arranged at positions of different light path lengths;
a focus evaluation value generation device which generates a focus evaluation value indicating a degree of sharpness of the image picked up by each of the image pickup devices; and
a focus control device which moves a focus of the picture-taking lens to a focusing position by controlling the focus of the picture-taking lens so that two focus evaluation values generated by the focus evaluation value generation device corresponding to the two image pickup devices, respectively, become equal to each other, wherein
the focus control device acquires a ratio (ΔAFV) between the two focus evaluation values,
determines a travel distance by multiplying the ΔAFV with a predetermined automatic focusing gain (AFG), if the focus evaluation values indicate a rear focus, the travel distance is determined by: $-(1/\Delta AFV-1) \cdot AFG$,
adds the travel distance to a current moving target position to a set a new target position, and
sets a moving speed of the picture-taking lens based on the ΔAFV between the current moving target position and a current position of the picture-taking lens, and as the picture-taking lens approaches the new target position, the ΔAFV between the focus evaluation values decrease, and the travel distance approaches zero.

3. An auto focus system, comprising:
two image pickup devices, each picking up an image of object light incident on a picture-taking lens, respectively, and being arranged at positions of different light path lengths;
a focus evaluation value generation device which generates two focus evaluation values AFV_A and AFV_B indicating a degree of sharpness of each of the images picked up by the image pickup devices, the focus evaluation value generation device includes:
a high pass filter to extract an analog high frequency component of one of the first and second images;
an analog/digital converter to convert the analog high frequency component into a digital signal; and
an adder to add values of the digital signal to generate the focus evaluation value of the one of the first and second images; and
a focus control device which moves a focus of the picture-taking lens to a focusing position by controlling the focus of the picture-taking lens so that two focus evaluation values generated by the focus evaluation value generation device corresponding to the two image pickup devices, respectively, become equal to each other, wherein the focus control device acquires a difference ($\Delta$AFV) between the two focus evaluation values (AFV_A−AFV_B), determines a travel distance by multiplying the $\Delta$AFV with a predetermined automatic focusing gain (AFG), so that AFG·$\Delta$AFV=AFG·AFV_A−AFG·AFV_B, adds the travel distance to a current moving target position to set a new target position, and sets a moving speed of the picture-taking lens based on the $\Delta$AFV between the current moving target position and a current position of the picture-taking lens, and as the picture-taking lens approaches the new target position, the $\Delta$AFV between the focus evaluation values decrease, and the travel distance approaches zero.

4. The auto focus system of claim 3, wherein the focus evaluation value generation device generates the focus evaluation values by analyzing a frequency spectrum of the first and second images.

5. An auto focus system, comprising:

two image pickup devices, each picking up an image of object light incident on a picture-taking lens, respectively, and being arranged at positions of different light path lengths;

a focus evaluation value generation device which generates two focus evaluation values AFV_A and AFV_B indicating a degree of sharpness of each of the images picked up by the image pickup devices;

a focus control device which moves a focus of the picture-taking lens to a focusing position by controlling the focus of the picture-taking lens so that two focus evaluation values generated by the focus evaluation value generation device corresponding to the two image pickup devices, respectively, become equal to each other, wherein the focus control device acquires a difference ($\Delta$AFV) between the two focus evaluation values (AFV_A−AFV_B), determines a travel distance by multiplying the $\Delta$AFV with a predetermined automatic focusing gain (AFG), so that AFG·$\Delta$AFV=AFG·AFV_A−AFG·AFV_B, adds the travel distance to a current moving target position to set a new target position, and sets a moving speed of the picture-taking lens based on the $\Delta$AFV between the current moving target position and a current position of the picture-taking lens, and as the picture-taking lens approaches the new target position, the $\Delta$AFV between the focus evaluation values decrease, and the travel distance approaches zero; and a light splitting system, including a semitransparent mirror partially reflecting the incident light to a first and a second right angle prism, wherein a hypotenuse face of the first prism is arranged to contact a hypotenuse face of the second prism to split a light path of the reflected incident light into the first light path and the second light path.

6. The auto focus system of claim 5, further comprising: a plurality of relay lenses arranged in light paths of the incident object light, a partially transmitted object light from the semitransparent mirror, and the partially reflected object light.

* * * * *